United States Patent [19]

Kigawa et al.

[11] Patent Number: 5,319,062
[45] Date of Patent: Jun. 7, 1994

[54] METHOD FOR CURING AN EPOXY RESIN WITH A POLYAMIDE DERIVED FROM A POLYAMIDE AND A SUBSTANTIALLY NON-CYCLIC DIMER ACID

[75] Inventors: Hitoshi Kigawa, Hiratsuka; Akira Ohishida, Tokyo, both of Japan

[73] Assignee: Lion Corporation, Tokyo, Japan

[21] Appl. No.: 922,465

[22] Filed: Jul. 30, 1992

[30] Foreign Application Priority Data

Jul. 31, 1991 [JP] Japan .................................. 3-213072
Jul. 31, 1991 [JP] Japan .................................. 3-213077

[51] Int. Cl.$^5$ ............................................ C08G 59/44
[52] U.S. Cl. ..................................... 528/123; 528/93; 528/111.3; 525/423; 525/530; 525/533
[58] Field of Search ...................... 528/123, 93, 111.3, 528/123; 525/423, 530, 533

[56] References Cited

U.S. PATENT DOCUMENTS

| | | | |
|---|---|---|---|
| 3,919,142 | 11/1975 | Asai et al. | 528/346 |
| 4,082,708 | 4/1978 | Mehta | 525/423 |
| 4,247,426 | 1/1981 | Hinze et al. | 528/111.3 |
| 4,421,906 | 12/1983 | Waddill et al. | 528/111.3 |
| 4,732,966 | 3/1988 | Wilson | 528/339.3 |
| 4,828,771 | 5/1989 | Kishima et al. | 528/123 |
| 5,128,441 | 7/1992 | Speranza | 528/338 |
| 5,130,351 | 7/1992 | Golownia | 528/123 |

FOREIGN PATENT DOCUMENTS 0194756 9/1986 European Pat. Off. .
2015448 10/1970 Fed. Rep. of Germany .

OTHER PUBLICATIONS

Encyclopedia of Chemical Technology 3rd Edition vol. 7 1979, pp. 768–781 "Dimer Acids".

Patent Abstracts of Japan, 5(136) (C-69)(808) Aug. 28, 1981 abstracting JP-56072018.
Patent Abstracts of Japan, 4(124) (C-23)(606) Sep. 2, 1980 Abstracting JP-55078014.

Primary Examiner—John C. Bleutge
Assistant Examiner—Randy Gulakowski
Attorney, Agent, or Firm—Wenderoth, Lind & Ponack

[57] ABSTRACT

An improvement is proposed in the curing method of an epoxy resin by the admixture of a polyamide as a cross-linking curing agent, in which the curing agent as well as the epoxy resin composition with admixture of the curing agent has an outstandingly low viscosity as compared with the use of a conventional polyamide to facilitate handling. The improvement can be obtained by using, as the polyamide, a condensation reaction product between (A) an alkylene polyamine having 4 to 20 carbon atoms in a molecule and (B) a dimeric acid mixture containing at least 50% by weight of a non-cyclic dimeric acid or an alkyl ester thereof represented by the general formula

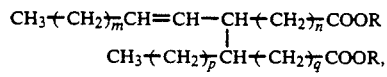

in which each R is, independently from the other, a hydrogen atom or a $C_{1-4}$ alkyl group obtained by the dimerization reaction of oleic acid or an alkyl ester thereof. When flexibility or bendability is desired of the cured epoxy resin, the condensation reaction is performed, in addition to the reactants (A) and (B), with admixture of a $C_{5-21}$ monobasic carboxylic acid or an alkyl ester thereof.

8 Claims, No Drawings

METHOD FOR CURING AN EPOXY RESIN WITH A POLYAMIDE DERIVED FROM A POLYAMIDE AND A SUBSTANTIALLY NON-CYCLIC DIMER ACID

BACKGROUND OF THE INVENTION

The present invention relates to a method for curing an epoxy resin with a curing agent. More particularly, the invention relates to a method for curing an epoxy resin with a curing agent which is a polyamide derived from a polyamine and a novel dimeric acid mixture capable of giving a curable epoxy resin composition having a relatively low viscosity and exhibiting good flowability at low temperatures as compared with conventional dimeric acid mixtures.

As is known, epoxy resins are cured by admixing the resin with a curing agent to form a curable epoxy resin composition and keeping the composition at room temperature or an elevated temperature. Various types of curing agents are known including the classes of catalytic curing agents and crosslinking curing agents and practically used. It is also known that the properties of the cured epoxy resin largely depend on the types of the curing agents. In this regard, each of the various curing agents has its own merits and demerits.

As a class of the above mentioned crosslinking curing agents for epoxy resins, polyamides derived from a polyamine and a dimeric acid, i.e. a dimer of an aliphatic carboxylic acid, are sometimes utilized advantageously due to the unique properties of the cured epoxy resin. A problem in the use of such a polyamide as a crosslinking curing agent of an epoxy resin, however, is that the epoxy resin composition after admixture with the curing agent has a relatively high viscosity with low flowability sometimes to cause inconveniences or decrease in the workability, for example, in resin casting.

Dimeric acid is a dibasic carboxylic acid obtained by the intermolecular addition reaction or dimerization between two molecules of an unsaturated fatty acid and is usually obtained as a mixture of several kinds of different molecular species. For example, commercial products of dimeric acid are each a mixture mainly consisting of one or more of dibasic carboxylic acids having 36 carbon atoms in a molecule in admixture with tribasic carboxylic acids having 54 carbon atoms in a molecule as a major secondary constituent.

Such a dimeric acid as a mixture has unique properties that it has high reactivity, it is a dibasic carboxylic acid having the largest molecular weight among those industrially available, it is strongly hydrophobic by virtue of the large hydrocarbon groups in the molecular structure, polymers derived from a dimeric acid are amorphous and flexible and have good mechanical properties at low temperatures and so on so that dimeric acid mixtures are useful in various applications.

In particular, amidation products of such a dimeric acid mixture without reactivity have characteristics of high tenacity along with elastic flexibility as well as strong adhesive power to various substrate surfaces. In addition, they have good miscibility with other kinds of resins such as those of ink vehicles. Therefore, the amidation products are useful as adhesives, additives in printing inks and coating compositions, sealants and the like. Reactive amidation products of a dimeric acid mixture have usefulness as an additive in epoxy resins used for coating of metals, plastics, masonry materials and the like or used as an adhesive of a two-component type.

A typical known method for the preparation of a dimeric acid mixture is that an unsaturated fatty acid is heated at a temperature of 200° to 250° C. in the presence of a catalyst which is usually a montmorillonitic clay to effect dimerization of the acid. In view of enhancement of the velocity of thermal polymerization when the starting unsaturated fatty acid has two trans-double bonds in conjugation, a standard industrial manufacturing process of dimeric acid mixtures has been established by using tall oil fatty acid or soybean oil fatty acid containing a large amount of linoleic acid as the starting material.

The dimeric acid mixture prepared by the above mentioned process, however, contains a relatively large amount of dimeric molecular species having a monocyclic or polycyclic structure, such as those expressed by the formulas

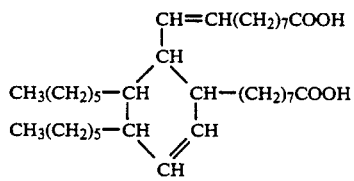

and

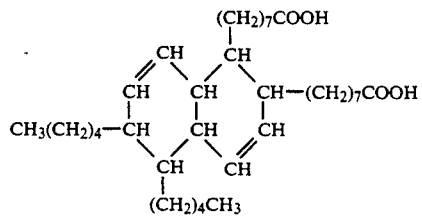

as a consequence of the high content of linoleic acid in the starting material so that the dimeric acid mixture has a high viscosity and high pour point to cause inconveniences in the use thereof. In particular, the amidation product obtained by the condensation reaction thereof with an alkylene diamine compound is defective in respect of the high melting point and high melt viscosity.

It is known in the organic chemistry that a hydrocarbon compound having a cyclic molecular structure generally has a higher melting point and higher melt viscosity than the corresponding compound having the same number of carbon atoms in a molecule but having a non-cyclic or straightly linear molecular structure as a consequence of the steric effect by the cyclic structure. It is reported in Journal of American Oil Chemists' Society, volume 51, page 522 (1974) that, when a mixture of unsaturated fatty acids containing 78% by weight of oleic acid is heated at about 250° C. in the presence of a montmorillonite catalyst to effect dimerization, the dimeric acid mixture obtained contains 40% by weight of non-cyclic dimeric acids with a decrease in the content of cyclic dimeric acids.

The polyamide derived from the dimeric acid mixture described above is still disadvantageous as a curing agent of epoxy resins in respect of the relatively high viscosity of the epoxy resin composition compounded therewith. It is of course a possible way that such a high-viscosity epoxy resin composition is diluted with an organic solvent such as xylene or an alcohol although use of an organic solvent causes problems that the epoxy resin after curing may have a decreased impact strength or poor thermal stability due to the trace amount of the residual organic solvent in addition to the serious problem that organic solvents in general are responsible for heavy environmental pollution. Accordingly, it is eagerly desired to develop a method for curing an epoxy resin with admixture of a curing agent, in which the epoxy resin composition after admixture of the curing agent may have a sufficiently low viscosity even without addition of an organic solvent.

SUMMARY OF THE INVENTION

The present invention accordingly has an object to provide an improvement in the method for curing an epoxy resin with admixture of a crosslinking curing agent free from the above described problems and disadvantages in the prior art methods. In particular, the invention has an object to provide an improvement in the method for curing an epoxy resin with admixture of a polyamide derived from a polyamine and a dimeric acid mixture by which the problems in the prior art methods can be solved.

Thus, the present invention provides an improvement, in the method for curing an epoxy resin by the admixture of a polyamide derived from a polyamine and a dimeric acid mixture as a curing agent, which comprises uniformly admixing the epoxy resin with, as the polyamide, a product of the condensation reaction between an alkylene polyamine having 4 to 20 carbon atoms in a molecule and a dimeric acid mixture containing at least 50% by weight of a dimeric acid or an alkyl ester thereof represented by the general formula

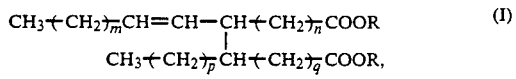
(I)

in which each R is, independently from the other, a hydrogen atom or an alkyl group having 1 to 4 carbon atoms and the subscripts m, n, p and q are each zero or a positive integer with the proviso that m+n is 13 and p+q is 15.

In particular, the condensation reaction between the alkylene polyamine and the dimeric acid mixture is performed in such a ratio of the reactants that, preferably, from 0.8 to 2.0 moles of the primary amino groups in the alkylene polyamine are provided per mole of the free or esterified carboxyl groups in the dimeric acid mixture.

Further, it is sometimes advantageous when a certain degree of flexibility or plasticity is desired of the cured epoxy resin that the condensation reaction between the alkylene polyamine and the dimeric acid mixture is performed in the presence of a monobasic carboxylic acid or an alkyl ester thereof represented by the general formula

(II)

in which R¹ is an alkyl or alkenyl group having 5 to 21 carbon atoms and R² is a hydrogen atom or an alkyl group having 1 to 4 carbon atoms, in an amount not exceeding 2 moles per mole of the dimeric acid constituents in the dimeric acid mixture.

DETAILED DESCRIPTION OF THE PREFERRED EMBODIMENTS

The above defined dimeric acid mixture can be prepared by heating a mixture of unsaturated fatty acids or esters thereof containing at least 70% by weight of oleic acid or an alkyl ester thereof at a temperature in the range from 200° to 300° C. in the presence of a strongly acidic catalyst of the Lewis acid type or Brønsted acid type. Namely, the dimeric acid mixture as one of the reactants in the condensation reaction with an alkylene polyamine can be prepared when and only when a specific mixture of unsaturated fatty acids is heated under specific conditions in the presence of a specific catalyst. The dimeric acid mixture obtained by such a process has a low viscosity and good flowability at low temperatures as compared with conventional dimeric acid mixtures. Further, the reaction product of such a dimeric acid mixture with an alkylene polyamine also has a low melting point and low melt viscosity as compared with similar amidation products of a conventional dimeric acid mixture.

In more detail, the dimeric acid mixture containing at least 50% by weight of a dimeric acid or a mono- or dialkyl ester thereof represented by the general formula (I) given above can be readily obtained by heating a mixture of fatty acids or esters thereof containing at least 70% by weight of oleic acid or a lower alkyl ester thereof at a temperature of 200° to 300° C. in the presence of a solid of liquid catalyst of the Lewis acid type or Bronsted acid type.

The starting material in the above mentioned reaction is a mixture of fatty acids having 18 carbon atoms in a molecule such as oleic acid, linoleic acid and the like as well as mono- and diesters thereof with an alkyl group having 1 to 4 carbon atoms such as methyl, ethyl, isopropyl, n-propyl, n-butyl and tert-butyl groups. These acids and/or esters can be used either singly or as a combination of two kinds or more according to need. It is essential, however, that the above mentioned mixture as the starting material of the reaction contains at least 70% by weight of oleic acid or an ester thereof. When the content of olecic acid or an ester thereof is lower than 70% by weight in the starting mixture, the resulting reaction product may contain only an insufficient amount of the desired dimeric acid or esters thereof represented by the general formula (I) so that the usefulness of the reaction product is decreased.

The catalyst, in the presence of which the above described starting material is heated, is of the Lewis acid type or Brønsted acid type either in the form of a solid or liquid. A preferable catalytic compound is an aluminosilicate or activated clays. The catalyst is used in an amount in the range from 2 to 8% by weight or, preferably, from 4 to 6% by weight based on the starting material.

The reaction mixture, i.e. the starting material admixed with the catalyst, is heated at a temperature in the range from 200° to 300° C. or, preferably, from 230° to 270° C. under an atmosphere of an inert gas such as nitrogen. The reaction can be performed under normal pressure but is advantageously under pressurization by using an autoclave. The reaction is complete usually within 5 to 7 hours although the exact length of time naturally depends on various factors such as the activity and amount of the catalyst, reaction temperature and so on.

As the reaction proceeds, the reaction mixture is gradually colored and imparted with an increased viscosity. After completion of the reaction, the reaction mixture is filtered to remove the solid catalyst and the filtrate is subjected to distillation under reduced pressure to be freed from the unreacted starting material and branched fatty acids or esters thereof formed as the by-product. Further, the residue from the distillation under reduced pressure is subjected to molecular distillation so that the desired dimeric acid mixture can be obtained, which is a slightly yellowish liquid at room temperature.

The thus obtained dimeric acid mixture has a lower viscosity and a lower pour point than the similar dimeric acid mixtures in the prior art derived from tall oil fatty acids or soybean oil fatty acids as the starting material.

The dimeric acid mixture obtained in the above described manner can be easily amidated by the condensation reaction with an alkylene polyamine compound having 4 to 20 carbon atoms in a molecule such as diethylenetriamine, triethylenetetraamine, tetraethylenepentamine, pentaethylenehexamine, hexaethyleneheptamine and the like.

Namely, the condensation reaction is performed by heating a mixture composed of the dimeric acid mixture and the alkylene polyamine in such a mixing ratio that from 0.8 to 2.0 moles of the primary amino groups in the alkylene polyamine are provided per mole of the free or esterified carboxyl groups in the dimeric acid mixture at a temperature in the range from 120° to 250° C. or, preferably, from 180° to 230° C., preferably, in an atmosphere of an inert gas such as nitrogen in order to prevent coloration of the reaction mixture. The reaction can be performed under normal pressure. The reaction time naturally depends on various factors such as the reaction temperature, kind of the alkylene polyamine compound and so on but the reaction is usually complete within 2 to 7 hours or, in most cases, 3 to 5 hours. As the reaction proceeds, the viscosity of the reaction mixture is gradually increased. The reaction mixture, which is liquid at the reaction temperature, usually does not solidify by cooling to room temperature so that the reaction product can be easily transferred from the reaction vessel to a storage vessel even at room temperature. It is of course optional, if so desired, that the reaction product is diluted with a mixture of an organic solvent such as xylene and an alcohol. The thus obtained amidation product of the dimeric acid mixture with an alkylene polyamine has a low viscosity of 10000 centipoise or lower at 40° C. so that it can be handled more easily that similar polyamides in the prior art and a uniform curable epoxy resin composition can be prepared without using an organic solvent by merely compounding an epoxy resin with the polyamide according to the invention. The compounding amount of the polyamide with an epoxy resin is usually in the range from 10 to 100 parts by weight per 100 parts by weight of the epoxy resin although the exact amount may depend on the epoxy equivalent of the resin and other factors. The epoxy resin compounded with the polyamide as the curing agent according to the invention is cured by keeping the composition at room temperature for about 48 hours or longer although the curing time can be shortened by heating at an elevated temperature.

When a certain degree of flexibility or plasticity is desired of the epoxy resin cured according to the invention described above, it is advantageous that the polyamide used as the curing agent of the epoxy resin is, instead of the product of the binary condenation reaction between the dimeric acid mixture and an alkylene polyamine, a product of a ternary condensation reaction including, besides the above mentioned two reactants, a monobasic carboxylic acid or an alkyl ester thereof represented by the general formula (II) given above. In the general formula (II), $R^1$ denotes an alkyl or alkylene group having 5 to 21 carbon atoms so that the carboxylic acid, with $R^2$ being a hydrogen atom, is exemplified by caproic acid, caprylic acid, pelargonic acid, capric acid, lauric acid, myristic acid, palmitic acid, stearic acid, arachidic acid, behenic acid, myristoleic acid, palmitoleic acid, oleic acid, elaidic acid, linoleic acid and the like. The methyl, ethyl, n-propyl, isopropyl, n-butyl, isobutyl and tert-butyl esters of these monobasic carboxylic acids can also be used. These acids and esters can be used either singly or as a combination of two kinds or more according to need. These acids or esters thereof play a role to adequately controlling the crosslinking density in the cured epoxy resin so as to impart flexibility or plasticity thereto.

As is mentioned before, the amidation reaction of the dimeric acid mixture and the alkylene polyamine is performed in such a mixing ratio that from 0.8 to 2.0 moles of the primary amino groups in the latter reactant are provided per mole of the free or esterified carboxyl groups in the former reactant. When the monobasic carboxylic acid or an alkyl ester thereof represented by the general formula (II) is used in combination, the molar amount thereof should not exceed 2 times relative to the dimeric acid constituents.

In the following, the present invention is described in more detail by way of examples which, however, never limit the scope of the invention in any way.

EXAMPLE 1

A dimeric acid mixture prepared by the dimerization reaction of oleic acid, which consisted of 58% by weight of non-cyclic dimeric acids, 25% by weight of cyclic dimeric acids and 17% by weight of trimeric acids, was admixed with diethylenetriamine in such a proportion that the molar ratio of the primary amino groups in the diethylenetriamine was equimolar to the carboxyl groups in the dimeric acid mixture and the mixture was heated in an atmosphere of nitrogen under a pressure of 5 mmHg first at 200° C. for 2.5 hours and then at 220° C. for 1 hour to give a polyamide mixture having a viscosity of 5500 centipoise at 40° C. as determined using a Brookfield viscosimeter.

A curable epoxy resin composition was prepared by uniformly blending 100 parts by weight of an epoxy resin having an epoxy equivalent of 190 (Epikote 828, a product by Yuka Shell Epoxy Co.) with 30 parts by weight of the above prepared polyamide mixture.

The epoxy resin composition could be cured by standing as such at room temperature for 48 hours into a clear solid resin.

EXAMPLE 2

The experimental procedure was substantially the same as in Example 1 except that the dimeric acid mixture, which was in the form of a methyl ester mixture, consisted of 55% by weight of non-cyclic dimeric molecules, 20% by weight of cyclic dimeric molecules and 25% by weight of trimeric molecules and the diethylenetriamine was replaced with a 50:50 by weight mixture of diethylenetriamine and triethylenetetramine in the preparation of the polyamide mixture which was blended in an amount of 40 parts by weight with 100 parts by weight of the epoxy resin. The polyamide mixture had a viscosity of 5300 centipoise at 40° C.

The epoxy resin composition could be cured into a transparent solid by standing for 48 hours at room temperature.

EXAMPLE 3

The experimental procedure was substantially the same as in Example 2 except that the 50:50 by weight mixture of diethylenetriamine and triethylenetetramine was replaced with a 50:50 by weight mixture of tetraerthylenepentamine and pentaethylenehexamine in the preparation of the polyamide mixture having a viscosity of 2500 centipoise at 40° C., which was blended in an amount of 55 parts by weight with 100 parts by weight of the epoxy resin.

The epoxy resin composition could be cured into a transparent solid by standing for 48 hours at room temperature.

EXAMPLE 4

The experimental procedure was substantially the same as in Example 1 except that the dimeric acid mixture, which was in the form of a methyl ester mixture, consisted of 52% by weight of non-cyclic dimeric molecules, 18% by weight of cyclic dimeric molecules, 2% by weight of methyl laurate, 10% by weight of methyl stearate, 15% by weight of methyl oleate and 3% by weight of methyl linoleate and the diethylenetriamine was replaced with the same molar amount of a 50:50 by weight mixture of triethylenetetramine and tetraethylenepentamine in the preparation of the polyamide mixture having a viscosity of 3300 centipoise at 40° C., which was blended in an amount of 50 parts by weight with 100 parts by weight of the epoxy resin.

The epoxy resin composition could be cured into a transparent solid by standing for 48 hours at room temperature.

EXAMPLE 5

The experimental procedure was substantially the same as in Example 4 except that the 50:50 by weight mixture of triethylenetetramine and tetraethylenepentamine was replaced with the same molar amount of tetraethylenepentamine alone in the preparation of the polyamide having a viscosity of 2100 centipoise at 40° C., which was blended in an amount of 55 parts by weight with 100 parts by weight of the epoxy resin.

The epoxy resin composition could be cured into a transparent solid by standing for 48 hours at room temperature.

EXAMPLE 6

The experimental procedure was substantially the same as in Example 1 except that the dimeric acid mixture, which was in the form of a methyl ester mixture, consisted of 25% by weight of non-cyclic dimeric molecules, 20% by weight of cyclic dimeric molecules, 25% by weight of trimeric molecules, 12% by weight of methyl stearate, 23% by weight of methyl oleate and 5% by weight of methyl linoleate and the diethylenetriamine was replaced with the same molar amount of a 25:50:25 by weight mixture of diethylenetriamine, triethylenetetramine and tetraethylenepentamine in the preparation of the polyamide having a viscosity of 3800 centipoise at 40° C., which was blended in an amount of 50 parts by weight with 100 parts by weight of the epoxy resin.

The epoxy resin composition could be cured into a transparent solid by standing for 48 hours at room temperature.

EXAMPLE 7

The experimental procedure was substantially the same as in Example 6 except that the ternary mixture of the alkylene polyamines was replaced with a 50:50 by weight mixture of tetraethylenepentamine and pentaethylenehexamine and the molar ratio of the primary amino groups in the polyamine mixture to the esterified carboxyl groups in the dimeric acid mixture was 1.1 instead of 1.0 in the preparation of the polyamide having a viscosity of 500 centipoise at 40° C., which was blended in an amount of 50 parts by weight with 100 parts by weight of the epoxy resin.

The epoxy resin composition could be cured into a transparent solid by standing for 48 hours at room temperature.

EXAMPLE 8

The experimental procedure was substantially the same as in Example 7 except that the binary mixture of the alkylene polyamines was replaced with pentaethylenehexamine alone and the molar ratio of the primary amino groups to the esterified carboxyl groups was 0.8 instead of 1.1 in the preparation of the polyamide mixture having a viscosity of 9800 centipoise at 40° C., which was blended in an amount of 55 parts by weight with 100 parts by weight of the epoxy resin.

The epoxy resin composition could be cured into a transparent and somewhat flexible solid by standing for 48 hours at room temperature.

EXAMPLE 9

The experimental procedure was substantially the same as in Example 7 except that the binary mixture of the alkylene polamines was replaced with 20:30:50 by weight mixture of triethylenetetramine, tetraethylenepentamine and pentaethylenehexamine and the molar ratio of the primary amino groups to the esterified carboxyl groups was 0.8 instead of 1.1 in the preparation of the polyamide mixture having a viscosity of 7200 centipoise at 40° C., which was blended in an amount of 55 parts by weight with 100 parts by weight of the epoxy resin.

The epoxy resin composition could be cured into a transparent and somewhat flexible solid by standing for 48 hours at room temperature.

EXAMPLE 10

The experimental procedure was substantially the same as in Example 9 except that the molar ratio of the primary amino groups to the esterified carboxyl groups was 1.4 instead of 0.8 in the preparation of the polyamide mixture having a viscosity of 1510 centipoise at 40° C., which was blended in an amount of 45 parts by weight with 100 parts by weight of the epoxy resin.

The epoxy resin composition could be cured into a transparent solid by standing for 48 hours at room temperature.

EXAMPLE 11

The experimental procedure was substantially the same as in Example 9 except that the molar ratio of the primary amino groups to the esterified carboxyl groups was 1.8 instead of 0.8 in the preparation of the polyamide mixture having a viscosity of 520 centipoise at 40° C., which was blended in an amount of 40 parts by weight with 100 parts by weight of the epoxy resin.

The epoxy resin composition could be cured into a transparent solid by standing for 48 hours at room temperature.

EXAMPLE 12

The experimental procedure was substantially the same as in Example 1 except that the dimeric acid mixture, which was in the form of a methyl ester mixture, consisted of 15% by weight of non-cyclic dimeric molecules, 10% by weight of cyclic dimeric molecules, 5% by weight of trimeric molecules, 17% by weight of methyl stearate, 43% by weight of methyl oleate and 10% by weight of methyl linoleate, the diethylenetriamine was replaced with a 25:50:25 by weight mixture of diethylenetriamine, triethylenetetramine and tetraethylenepentamine and the molar ratio of the primary amino groups to the esterified carboxyl groups was 1.2 instead of 1.0 in the preparation of the polyamide mixture having a viscosity of 1000 centipoise at 40° C., which was blended in an amount of 40 parts by weight with 100 parts by weight of the epoxy resin.

The epoxy resin composition could be cured into a transparent solid by standing for 48 hours at room temperature.

EXAMPLE 13

The experimental procedure was substantially the same as in Example 7 except that the molar ratio of the primary amino groups to the esterified carboxyl groups was 0.9 instead of 1.1 in the preparation of the polyamide mixture having a viscosity of 4500 centipoise at 40° C., which was blended in an amount of 40 parts by weight with 100 parts by weight of the epoxy resin.

The epoxy resin composition could be cured into a transparent solid by standing for 48 hours at room temperature.

COMPARATIVE EXAMPLE 1

The experimental procedure was substantially the same as in Example 2 except that the dimeric acid mixture, which was in the form of a methyl ester mixture, consisted of 25% by weight of non-cyclic dimeric molecules, 50% by weight of cyclic dimeric molecules and 25% by weight of trimeric molecules in the preparation of the polyamide mixture having a viscosity of 24,500 centipoise at 40° C., which was blended in an amount of 40 parts by weight with 100 parts by weight of the epoxy resin.

The epoxy resin composition could be cured into a transparent solid by standing for 48 hours at room temperature.

COMPARATIVE EXAMPLE 2

The experimental procedure was substantially the same as in Example 4 except that the dimeric acid mixture, which was in the form of a methyl ester mixture, consisted of 28% by weight of non-cyclic dimeric molecules, 42% by weight of cyclic dimeric molecules, 2% by weight of methyl laurate, 10% by weight of methyl stearate, 15% by weight of methyl oleate and 3% by weight of methyl linoleate in the preparation of the polyamide mixture having a viscosity of 13,100 centipoise at 40° C., which was blended in an amount of 50 parts by weight with 100 parts by weight of the epoxy resin.

The epoxy resin composition could be cured into a transparent solid by standing for 48 hours at room temperature.

COMPARATIVE EXAMPLE 3

The experimental procedure was substantially the same as in Comparative Example 2 except that the dimeric acid mixture, which was in the form of a methyl ester mixture, consisted of 15% by weight of non-cyclic dimeric molecules, 30% by weight of cyclic dimeric molecules, 15% by weight of trimeric molecules, 12% by weight of methyl stearate, 23% by weight of methyl oleate and 5% by weight of methyl linoleate and the binary mixture of the alkylene polyamines was replaced with the same molar amount of a 25:50:25 by weight mixture of diethylenetriamine, triethylenetetramine and tetraethylenepentamine in the preparation of the polyamide mixture having a viscosity of 15,200 centipoise at 40° C., which was blended in an amount of 50 parts by weight with 100 parts by weight of the epoxy resin.

The epoxy resin composition could be cured into a transparent solid by standing for 48 hours at room temperature.

COMPARATIVE EXAMPLE 4

The experimental procedure was substantially the same as in Example 2 except that the molar ratio of the primary amino groups in the alkylene polyamine mixture to the esterified carboxyl groups in the dimeric acid mixture was 0.7 instead of 1.0 in the preparation of the polyamide mixture having a viscosity of 23,000 centipoise at 40° C., which was blended in an amount of 50 parts by weight with 100 parts by weight of the epoxy resin.

The epoxy resin composition could be cured into a solid, which, however, was cloudy, by standing for 48 hours at room temperature.

EXAMPLE 14

The experimental procedure was substantially the same as in Example 5 except that the dimeric acid mixture in the form of methyl esters was replaced with the same molar amount of another dimeric acid mixture in the form of an ethyl ester mixture in the preparation of the polyamide mixture having a viscosity of 2000 centipoise at 40° C., which was blended in an amount of 55 parts by weight with 100 parts by weight of the epoxy resin.

The epoxy resin composition could be cured into a transparent solid by standing for 48 hours at room temperature.

EXAMPLE 15

The experimental procedure was substantially the same as in Example 6 except that the dimeric acid mixture in the form of methyl esters was replaced with the same molar amount of another dimeric acid mixture in the form of an isopropyl ester mixture in the preparation of the polyamide mixture having a viscosity of 2000 centipoise at 40° C., which was blended in an amount of 55 parts by weight with 100 parts by weight of the epoxy resin.

The epoxy resin composition could be cured into a transparent solid by standing for 48 hours at room temperature.

EXAMPLE 16

A dimeric acid mixture consisting of 55% by weight of non-cyclic dimeric molecules, 20% by weight of cyclic molecules and 25% by weight of trimeric molecules was admixed with the same binary mixture of the alkylene polyamines as used in Example 2 in a proportion to give a molar ratio of the primary amino groups in the latter to the carboxyl groups in the former of 1.9 and the mixture was further admixed with a mixture of monobasic carboxylic acid consisting of 10% by weight of stearic acid, 75% by weight of oleic acid and 15% by weight of linoleic acid in such an amount that the molar ratio of these monobasic carboxylic acids to the carboxylic acids in the dimeric acid mixture was 1.5 followed by heating of the mixture in an atmosphere of nitrogen under a pressure of 5 mmHg first at 200° C. for 2.5 hours and then at 230° C. for 1 hour to give a polyamide mixture which had a viscosity of 1200 centipoise at 25° C.

The same epoxy resin as used in Example 1 was admixed with 50% by weight of the above prepared polyamide mixture to give a uniform composition which could be cured by standing at room temperature for 48 hours to give a transparent cured solid having good flexibility and bendability.

EXAMPLE 17

A dimeric acid mixture in the form of a methyl ester mixture consisting of 55% by weight of non-cyclic dimeric molecules, 20% by weight of cyclic molecules and 25% by weight of trimeric molecules was admixed with the same binary mixture of the alkylene polyamines as used in Example 2 in a proportion to give a molar ratio of the primary amino groups in the latter to the esterified craboxyl groups in the former of 1.9 and the mixture was further admixed with a mixture of monobasic carboxylic acids each in the form of a methyl ester consisting of 10% by weight of methyl stearate, 75% by weight of methyl oleate and 15% by weight of methyl linoleate in seuch an amount that the molar ratio of these monobasic carboxylic acid esters to the carboxylic acid esters in the dimeric acid mixture was 1.5 followed by heating of the mixture in an atmosphere of nitrogen first at 200° C. for 2.5 hours and then at 230° C. for 1 hour to give a polyamide mixture which had a viscosity of 1100 centipoise at 25° C.

The same epoxy resin as used in Example 1 was admixed with 50% by weight of the above prepared polyamide mixture to give a uniform composition which could be cured by standing at room temperature for 48 hours to give a transparent cured solid having good flexibility and bendability.

EXAMPLE 18

The experimental procedure was substantially the same as in Example 17 except that the 50:50 by weight mixture of the alkylene polyamines was replaced with a 50:50 by weight mixture of tetraethylenepentamine and pentaethylenehexamine, the molar ratio of the primary amino groups in the alkylene polyamine mixture to the esterified carboxyl groups in the dimeric acid mixture was 1.5 instead of 1.9, the mixture of monobasic carboxylic acid methyl esters consisted of 10% by weight of methyl laurate, 10% by weight of methyl stearate, 50% by weight of methyl oleate and 30% by weight of methyl linoleate and the molar ratio of these monobasic carboxylic acid esters to the carboxylic acid esters in the dimeric acid mixture was 1.9 instead of 1.5. The thus obtained polyamide mixture had a viscosity of 1500 centipoise at 25° C.

The performance of this polyamide mixture as a curing agent of the same epoxy resin as used in Example 1 was as satisfactory as in Example 17 to give a cured solid resin having good flexibility and bendability.

EXAMPLE 19

The experimental procedure was substantially the same as in Example 17 except that the dimeric acid mixture in the form of a methyl ester mixture consisted of 50% by weight of non-cyclic dimeric molecules, 20% by weight of cyclic dimeric molecules and 30% by weight of trimeric molecules, the binary mixture of the alkylene polyamines was replaced with the same molar amount of tetraethylenepentamine alone and the molar ratio of the methyl ester mixture of monobasic carboxylic acids to the dimeric acid mixture was 1.0 instead of 1.5. The thus obtained polyamide mixture had a viscosity of 1300 centipoise at 25° C.

The performance of this polyamide mixture as a curing agent of the same epoxy resin as used in Example 1 was as satisfactory as in Example 17 to give a cured solid having good flexibility and bendability.

COMPARATIVE EXAMPLE 5

The experimental procedure was substantially the same as in Example 18 except that the dimeric acid mixture in the form of a methyl ester mixture consisted of 25% by weight of non-cyclic dimeric molecules, 50% by weight of cyclic dimeric molecules and 25% by weight of trimeric molecules. The thus prepared polyamide mixture had a viscosity of 8500 centipoise at 25° C.

This polyamide mixture had miscibility with the epoxy resin but failed to give a cured solid resin having good flexibility.

COMPARATIVE EXAMPLE 6

The experimental procedure was substantially the same as in Example 19 except that the dimeric acid mixture in the form of a methyl ester mixture consisted of 28% by weight of non-cyclic dimeric molecules, 42% by weight of cyclic dimeric molecules and 30% by weight of trimeric molecules and the molar ratio of the primary amine groups in the alkylene polyamine to the esterified carboxyl groups in the dimeric acid mixture was 0.9 instead of 1.9. The thus prepared polyamide mixture had a viscosity of 11,200 centipoise at 25° C.

This polyamide mixture had miscibility with the epoxy resin but failed to give a cured solid resin having good flexibility.

COMPARATIVE EXAMPLE 7

The experimental procedure was substantially the same as in Example 17 except that the dimeric acid mixture in the form of a methyl ester mixture consisted of 25% by weight of non-cyclic dimeric molecules, 50% by weight of cyclic dimeric molecules and 25% by weight of trimeric molecules and the molar ratio of the methyl ester mixture of monobasic carboxylic acids to the dimeric acid mixture was 2.1 instead of 1.5. The thus prepared polyamide mixture had a viscosity of 7300 centipoise at 25° C.

This polyamide mixture had miscibility with the epoxy resin but failed to give a cured solid resin having good flexibility.

EXAMPLE 20

A dimeric acid mixture prepared by the dimerization reaction of oleic acid and consisting of 55% by weight of non-cyclic dimeric molecules, 20% by weight of cyclic dimeric molecules and 25% by weight of trimeric molecules was blended with tetraethylenepentamine in such a proportion that the molar ratio of the primary amino groups in the tetraethylenepentamine to the carboxyl groups in the dimeric acid mixture was 1.5 and the blend was heated at 230° C. for 1 hour in an atmosphere of nitrogen under a pressure of 5 mmHg to give a polyamide mixture having a viscosity of 2000 centipoise at 25° C. This polyamide mixture had good miscibility with epoxy resins and the epoxy resin admixed with the same could be cured by standing at room temperature for 48 hours into a cured resin having good flexibility and bendability.

EXAMPLE 21

A dimeric acid mixture in the form of an ethyl ester mixture prepared by the dimerization reaction of ethyl oleate and consisting of 55% by weight of diethyl esters of non-cyclic dimeric acids, 20% by weight of diethyl esters of cyclic dimeric acids and 25% by weight of trimethyl esters of trimeric acids was admixed with a mixture of 10% by weight of ethyl stearate, 75% by weight of ethyl oleate and 15% by weight of ethyl linoleate in such a proportion that the molar ratio of these esters of monobasic carboxylic acids to the di- and triesters in the dimeric acid mixture was 1.5 and this mixture was further admixed with a 50:50 by weight mixture of diethylenetriamine and triethylenetetramine in such a proportion that the molar ratio of the primary amino groups in these alkylene polyamines to the esterified carboxyl groups in the ethyl ester mixture was 1.9 and the mixture was heated in the same manner as in Example 20 to give a polyamide mixture having a viscosity of 1050 centipoise at 25° C. This polyamide mixture had excellent miscibility with epoxy resins to exhibit good curing behavior of the resin composition.

What is claimed is:

1. In a method for curing an epoxy resin by the admixture of a polyamide derived from a polyamine and a dimeric acid mixture as a curing agent, the improvement which comprises uniformly admixing the epoxy resin with, as the polyamide, a product of the condensation reaction between:

(A) an alkylene polyamine having 4 to 20 carbon atoms in a molecule; and (B) a dimeric acid mixture containing at least 50% by weight of a non-cyclic dimeric acid or an alkyl ester thereof represented by the general formula

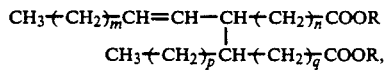

in which each R is, independently from the other, a hydrogen atom or an alkyl group having 1 to 4 carbon atoms and the subscripts m, n, p and q are each zero or a positive integer with the proviso that m+n is 13 and p+q is 15.

2. The method as claimed in claim 1 in which the product of the condensation reaction as a polyamide is a product of the condensation reaction between the alkylene polyamine as the reactant (A) and the dimeric acid mixture as the reactant (B) in such a proportion that the molar ratio of the primary amino groups in the alkylene polyamine and the carboxyl groups or esterified carboxyl groups in the dimeric acid mixture is in the range from 0.8 to 2.

3. In a method for curing an epoxy resin by the admixture of a polyamide derived from a polyamine and a dimeric acid mixture as a curing agent, the improvement which comprises uniformly admixing the epoxy resin with, as the polyamide, a product of the condensation reaction between:

(A) an alkylene polyamine having 4 to 20 carbon atoms in a molecule; and a combination of (B) a dimeric acid mixture containing at least 50% by weight of a non-cyclic dimeric acid or an alkyl ester thereof represented by the general formula

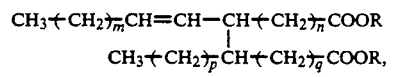

in which each R is, independently from the other, a hydrogen atom or an alkyl group having 1 to 4 carbon atoms and the subscripts m, n, p and q are each zero or a positive integer with the proviso that m+n is 13 and p+q is 15; and (C) a monobasic carboxylic acid or an alkyl ester thereof represented by the general formula

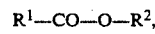

in which $R^1$ is an alkyl group or an alkenyl group having 5 to 21 carbon atoms and $R^2$ is a hydrogen atom or an alkyl group having 1 to 4 carbon atoms.

4. The method as claimed in claim 3 in which the product of the condensation reaction as a polyamide is a product of the condensation reaction in which the molar ratio of the alkylene polyamine as the reactant (A) and the dimeric acid mixture as the reactant (B) is such that the molar ratio of the primary amino groups in the alkylene polyamine and the carboxyl groups or esterified carboxyl groups in the dimertic acid mixture is in the range from 0.8 to 2.0.

5. The method as claimed in claim 3 in which the molar ratio of the monobasic acid or an alkyl ester thereof as the reactant (C) to the dimeric acid mixture as the reactant (B) does not exceed 2.0.

6. The method as claimed in claim 1 in which the amount of the polyamide as the curing agent is in the range from 10 to 100 parts by weight per 100 parts by weight of the epoxy resin.

7. The method as claimed in claim 3 in which the amount of the polyamide as the curing agent is in the range from 10 to 100 parts by weight per 100 parts by weight of the epoxy resin.

8. The method as claimed in claim 3 in which the monobasic acid or an alkyl ester thereof as the reactant (C) is selected from the group consisting of lauric acid, stearic acid, oleic acid, linoleic acid, methyl esters thereof and ethyl esters thereof.

* * * * *